(12) United States Patent
Westergaard

(10) Patent No.: US 8,870,546 B2
(45) Date of Patent: Oct. 28, 2014

(54) ENHANCING STIFFNESS OF WIND TURBINE BLADES

(76) Inventor: Carsten Hein Westergaard, Houston, TX (US)

( * ) Notice: Subject to any disclaimer, the term of this patent is extended or adjusted under 35 U.S.C. 154(b) by 564 days.

(21) Appl. No.: 13/148,144

(22) PCT Filed: Jan. 21, 2010

(86) PCT No.: PCT/EP2010/000368
§ 371 (c)(1),
(2), (4) Date: Aug. 10, 2011

(87) PCT Pub. No.: WO2010/091773
PCT Pub. Date: Aug. 19, 2010

(65) Prior Publication Data
US 2011/0293433 A1   Dec. 1, 2011

Related U.S. Application Data

(60) Provisional application No. 61/151,668, filed on Feb. 11, 2009.

(30) Foreign Application Priority Data

Feb. 11, 2009 (GB) .................................. 0902268.2

(51) Int. Cl.
*F03D 1/06* (2006.01)
(52) U.S. Cl.
CPC ............. *F03D 1/068* (2013.01); *F05B 2240/30* (2013.01); *Y02E 10/721* (2013.01); *F03D 1/0675* (2013.01)
USPC ......... 416/223 R; 416/226; 416/232; 416/233

(58) Field of Classification Search
USPC ............................... 416/223 R, 226, 232, 233
See application file for complete search history.

(56) References Cited

U.S. PATENT DOCUMENTS 2,362,301 A * 11/1944 Pecker ........................... 416/225
4,295,790 A * 10/1981 Eggert, Jr. ..................... 416/226
4,339,230 A * 7/1982 Hill ................................ 416/226
(Continued)

FOREIGN PATENT DOCUMENTS

DE       38 25 241        10/1989
DK       200501805        6/2007
(Continued)

OTHER PUBLICATIONS

The International Bureau of WIPO, International Preliminary Report on Patentability, 6 pgs. Aug. 16, 2011.
(Continued)

*Primary Examiner* — Igor Kershteyn
(74) *Attorney, Agent, or Firm* — Wood, Herron & Evans, LLP

(57) ABSTRACT

Edgewise stiffness of a wind turbine blade is enhanced by arranging a tension element between anchor points at the ends of a load bearing member in the turbine blade such as a spar or a beam. The tension element is spaced away from the load bearing member on the trailing edge side of the load bearing member by struts and acts as a suspension cable. Several tension elements may be used and a similar tension element may be arranged on the leading edge side of the load bearing member.

17 Claims, 3 Drawing Sheets

(56) References Cited

U.S. PATENT DOCUMENTS

| | | | |
|---|---|---|---|
| 4,389,162 A | | 6/1983 | Doellinger et al. |
| 5,534,354 A | * | 7/1996 | Gregg et al. .................. 428/593 |
| 2007/0217918 A1 | | 9/2007 | Baker et al. |
| 2010/0008789 A1 | * | 1/2010 | Jensen .......................... 416/233 |
| 2010/0014979 A1 | * | 1/2010 | Jensen .......................... 416/223 R |
| 2010/0092300 A1 | * | 4/2010 | Jensen et al. .................. 416/233 |

FOREIGN PATENT DOCUMENTS

| | | |
|---|---|---|
| GB | 292 953 | 8/1923 |
| GB | 2 042 093 | 9/1980 |
| GB | 2 115 075 | 9/1983 |
| GB | 2 416 195 | 1/2006 |
| SU | 1747742 | 7/1992 |
| WO | 2008071195 | 6/2008 |
| WO | WO 2008086805 A2 * | 7/2008 |
| WO | WO 2008089765 A2 * | 7/2008 |
| WO | 2008111841 | 9/2008 |

OTHER PUBLICATIONS

John Twin; Combined Search and Examination Report issued in priorty GB Application No. GB0902268.2; Jun. 9, 2009; 5 pages; GB Intellectual Property Office.

Raffaele Di Renzo; International Search Report and Written Opinion issued in priority International Application No. PCT/EP2010/000368; Feb. 14, 2011; 11 pages; European Patent Office.

* cited by examiner

ENHANCING STIFFNESS OF WIND TURBINE BLADES

This invention relates to wind turbines, and in particular, to wind turbine blades.

In recent years, as wind turbines have evolved to become a commercially viable way of generating electricity to supply national grids, the size of wind turbines has increased. The blade length has also increased significantly and many modern wind turbines have a blade length that exceeds 40 m. As wind turbines continue to increase in size, so blades will inevitably become longer. However, longer blades present a number of problems, particularly as many variables do not scale linearly with blade length. Of particular importance is the edgewise loading on the blade which scales with the fourth power of blade length.

Loading generally scales with the cube of length but edgewise loading also depends on the distance to the centre of gravity which scales with length. Edgewise loading is mainly gravity driven fatigue caused by rotation of the wind turbine rotor. Thus, when designing longer wind turbine blades, consideration must be given to the edgewise loading which increases with the fourth power of the blade length. This is illustrated by FIG. 1 which shows a wind turbine blade having a weight 10 acting at a centre of gravity a distance x from the root of the blade and an overall length L.

The present invention aims to address this problem and to provide a blade structure that can support the additional edgewise loading generated by an increased blade length.

According to the invention there is provided a wind turbine blade comprising a load bearing member and a blade shell, the blade having a leading edge and a trailing edge, and a tension element spaced apart from the load bearing member, the tension element being anchored at its ends to the load bearing member.

Preferably, the ends of the tension element are anchored to respective ends of the load bearing member. However, in some preferred embodiments, a first end of the tension element may be anchored to the root end of the load bearing member and a second end of the tension element may anchored to the load bearing member at a point away from a tip end of the load bearing member. This latter type of construction may be desirable where the blade is made in modular sections are where space at the end of the load bearing member near the beam.

Preferably at least one support strut is attached to the load bearing member and extends away from the load bearing member, the support strut supporting the tension element at a position spaced away from the load bearing member. The tension element may pass through an aperture in the support strut. The struts may each comprise a pair of legs, each leg having an end connected to the load bearing member, the struts receiving the tension element to space the tension element away from the load bearing member. Alternatively, the struts may each comprise three legs, each leg having an end connected to the load bearing member, the struts receiving the tension element to space the tension element away from the load bearing member. This latter construction may be particularly advantageous as it enables the twist of the blade to be taken into account. The arrangement of the struts enables the tension element to behave as a suspension cable with the struts behaving as suspenders.

One preferred embodiment of the invention provides a plurality of tension elements which include connecting elements to connect adjacent tension elements together to form a single tension element. This arrangement is particularly advantageous in a modular blade. The connecting elements may each comprise a tensioner for varying the tension in the tension elements.

A further preferred embodiment comprises a plurality of tension elements, each ends anchored to the load bearing member and at least one support strut spaces each tension element away from the load bearing member.

The tension element may be arranged on the trailing edge side of the load bearing member. The use of a tension element on the trailing edge side of the load bearing member has the advantage of increasing blade stiffness in the edgewise direction by increasing the second moment of inertia. This increase in stiffness makes it feasible to increase blade length without increasing the likelihood of fatigue failure along the trailing edge.

In one embodiment of the invention the tension element is arranged on the leading edge side of the load bearing member.

In one preferred embodiment of the invention the tension element is arranged on the trailing edge side of the load bearing member and a further tension element is anchored at its ends to the load bearing member and spaced apart from the load bearing member on the leading edge side of the load bearing member by at least one strut. This arrangement has the advantage of providing similar stiffness enhancement of the leading edge side of the blade. The tension element on the leading edge side of the load bearing member may be integral with the leading edge of the blade.

Embodiments of the invention may be used with any load bearing member in a wind turbine blade. In one preferred arrangement the load bearing member is a beam and the blade shell is attached to the beam. In another preferred arrangement the load bearing member comprises reinforced areas of the shell interconnected by a web.

The invention also provides a wind turbine having a plurality or blades as defined above.

Embodiments of the invention will now be described, by way of example only, and with reference to the accompanying drawings, in which.

Figure 1:
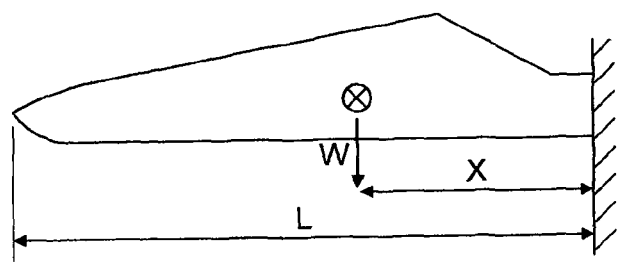
FIG. 1 (referred to above) is a schematic illustration of a wind turbine blade showing the effect of length on edgewise loading.
Figure 2:
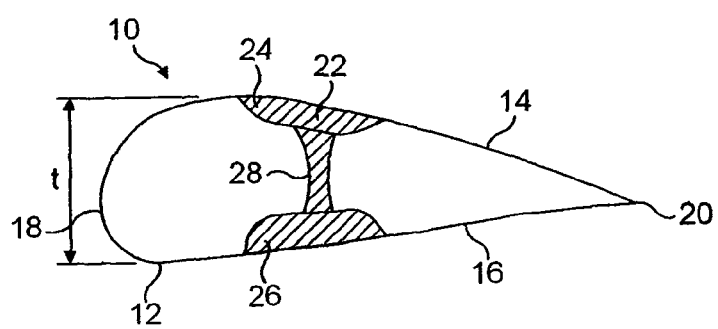
FIG. 2 is a cross-section through a conventional blade.

Referring to FIG. 2, there is shown a representative cross section through a wind turbine blade. The blade 10 comprises a shell 12 which is typically moulded from upper and lower shell halves 14, 16. The blade has a leading edge 18 and a trading edge 20. The shell is designed to be as lightweight as possible and is arranged to transfer aerodynamic forces onto a load carrying or load bearing member 22 which extends along the length of the blade from the root towards the tip.

Two main types of load bearing member are commonly used. The arrangement shown in FIG. 2 comprises load bearing fibres 24, 26 embedded into the upper and lower shell halves respectively and spaced apart by a web 28. Alternatively, it is common to use a beam having a square or rectangular cross section. Both of the types of load bearing members are commonly referred to as beams or spars. The invention is not limited to any particular type of load bearing member.

Where the load bearing member comprises strengthening fibres, these fibres are embedded in the shell during manufacture of the shell. Where a separate beam is used, the beam is manufactured first, and the shell is added afterwards.

As shown in FIG. 2, the load carrying fibres are placed as far apart as possible, that is where the height of the blade cross section t is at a maximum. This positioning maximises the strength of the blade and provides maximum resistance to bending in a flapwise direction. The load bearing member is designed to carry flapwise loads and its positioning leaves little room for carrying edgewise loads. These loads are therefore carried by the leading edge 18 and the trailing edge 20 of the blade. Thus, whereas flapwise stiffness is provided by the load bearing member, edgewise stiffness is largely provided by the shell 12. As can be seen from FIG. 2, the leading edge is relatively large and smooth and is typically easy to make strong and stiff. However, the trailing edge tapers to a point and is more difficult to stiffen. This is particularly the case where the trailing edge carries movable control surfaces. Observation of damage to wind turbine blades in use shows that damage to the trailing edge frequently occurs, particularly at around $\frac{1}{3}^{rd}$ of the length of the blade from the root. It is at this point that the height t of the blade begins to taper off and gravity driven bending is very high.

Figure 3:
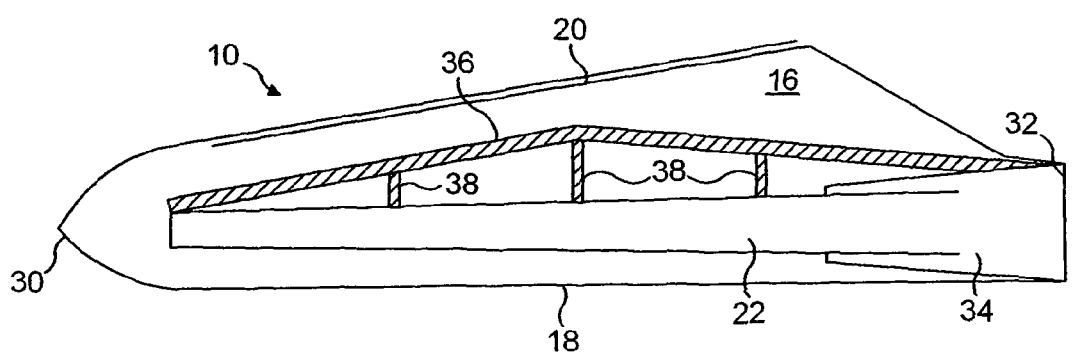
FIG. 3 is a schematic view of a first embodiment of the invention.

Turning now to FIG. 3, a first embodiment of the invention will be described. FIG. 3 is a schematic plan of a wind turbine blade embodying the invention. It will be appreciated that the load bearing member and the strengthening element to be described are internal features which would not normally be visible. FIG. 3 uses the same numbering as FIG. 2 with the blade tip shown at 30 and the blade root at 32. The load bearing member can be seen to extend from the blade root 32 to a position near the blade tip 30. The load bearing member has an enlarged portion 34 at the root end which has a width equal to the root diameter. This enlarged portion tapers gradually towards the point of maximum chord width at which point the member becomes narrower. A strengthening member 36 is arranged on the trailing edge side of the load bearing member. The strengthening member is a tension element extends longitudinally along the blade and which is offset from the load bearing member by a plurality of struts 38. The tension element 36 is anchored to the root and tip ends of the load bearing member 22. The tension element 36 acts as a suspension element with the struts 38 acting as suspender elements.

The tension element 36 is preferably made from a high strength material. A suitable example is a pre-tensioned carbon fibre in a pultruded profile, for example, having a circular cross section. The offsetting of the tension element from the load bearing member 23 increases the second moment of inertia of the load bearing member so stiffening the load bearing member and the blade in an edgewise direction.

Figure 5A:
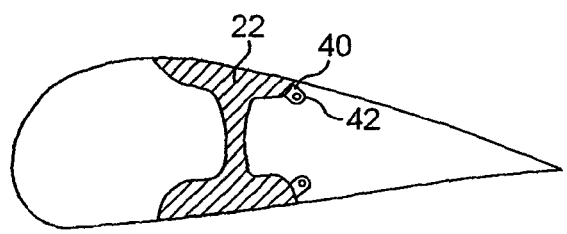
FIGS. 5a and 5b show how enhanced stiffening may be attached to the main beam of a blade.
Figure 5B:
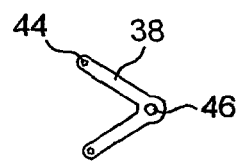

FIGS. 5a and 5b show how the struts 38 may be attached to the load bearing member 22.

In FIG. 5a, anchor points for the struts are fitted to the support member. The anchor point 40 may comprise metal plates moulded into the support member and having eyelets 42 to which free ends of the struts 38 may be attached through corresponding eyelets 44 (FIG. 5b). A separate strut is attached to both the top and the bottom of the support member. The two struts are joined at their opposite ends at which point an aperture 46 is provided to receive the tension element 36. The two struts may be made as a single piece. The drawings show a simplified version of a wind turbine blade. In practice, the blade has a degree of twist along its length and the beam is correspondingly twisted. Thus, the various struts along the length of the beam will not lie in the same plane. An alternative to supporting the tension element with pairs of struts is to use a tripod assembly with three individual struts, or a single strut with three legs, at each of the mounting points along the beam.

The tension element may comprise any high strength material and the cross section of the element is not important. In the cross sectional view of FIG. 4, the tension element 36 is shown as circular and massive. However, it could have a different shape and may be tubular rather than solid. As wind turbine blades become longer, so it may be desirable to make the blades in several sections, for example, to facilitate transportation. The blades are then assembled at the turbine site. FIG. 5c shows, schematically, how tensioners 48 may be included at various points on the tension element 36 between adjacent struts or between a strut and an end of the beam. Once the blade has been assembled, the tensioners can be used to connected the parts of the tension element together and then adjusted to tension the tension element as desired. In FIG. 5c, the dotted lines 50 represent the boundaries between the sections. Alternatively, the tensioners may be arranged to be located at the edge of the modular sections for ease of access.

It has been proposed that longer wind turbine blades could include an amount of pre-bend. That is, the end-most section or portion of the blades may be moulded such to curve away from the direction of the tension element and away from the original shape of the blade. This may be achieved with the embodiment without the need to change the mould to introduce the pre-bend. When the tension element is installed with a tensioner the tension at the tip end of the blade can be adjusted to bend the blade so that the blade will adopt shape the originally designed pre-bend shape.

Figure 4:
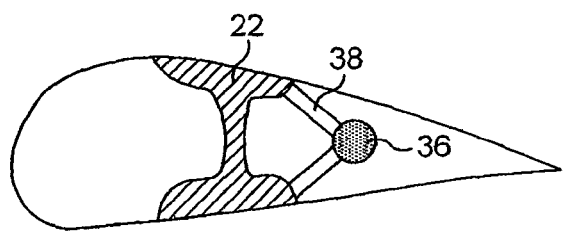
FIG. 4 is a similar view to FIG. 2 showing the first embodiment of the invention.
Figure 5C:
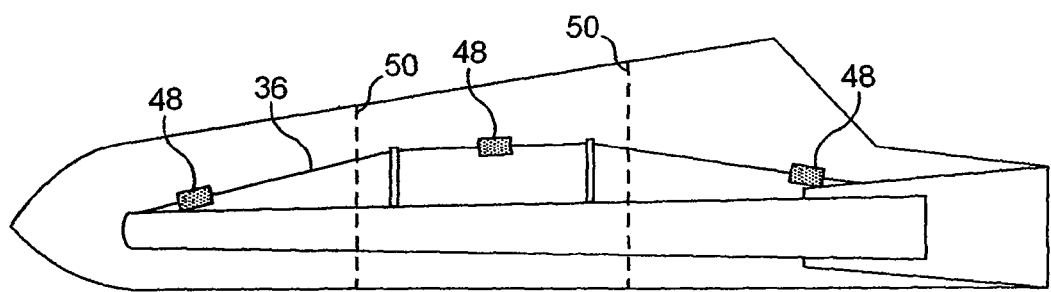
FIG. 5c shows the use of tensioners.
Figure 6:
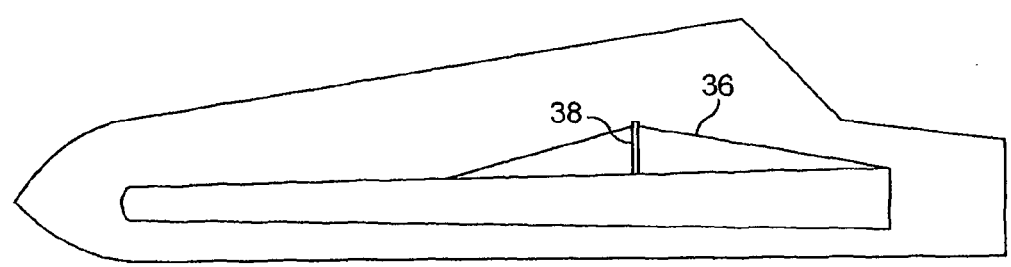
FIG. 6 is a schematic view of a second embodiment of the invention.

In the embodiments of FIGS. 3, 4 and 5, the tension element, whether comprised of a single tension member or several connected tensioned members, is anchored to the ends of the beam at the blade root and towards the tip. This can clearly be seen, for example, from FIG. 3. FIG. 6 shows a second embodiment of the invention in which the tension element is anchored to the root of the beam but, at its tipwards end, is anchored at a point away from the tip of the beam. In the case illustrated, the tension element is anchored approximately one third of the length of the beam away from the beam tip. The tension member still functions as a suspension cable and is suspended away from the beam by struts 38. This type of arrangement is particularly suited to a modular blade construction where the final, tipwards, part of the blade may have no tension element. As this part of the blade is relatively thin it is difficult to install a tension element towards the tip.

Figure 7:
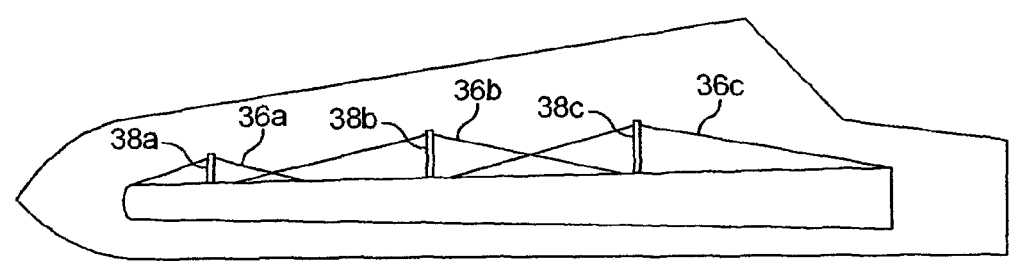
FIG. 7 is a schematic view of a third embodiment of the invention.

FIG. 7 shows a third embodiment of the invention in which a plurality of tension elements is used, each tension element acting as a suspension cable and being anchored at its ends to the beam. Moreover, each of the tension elements is suspended away from the beam on the trailing edge side of the beam by a strut arrangement similar to that shown in FIG. 5b, or a tripod alternative, acting as a suspender cable. In FIG. 7, three tension elements are shown at 36a, 36b and 36c. Adjacent tension elements may overlap one another, as can be seen with tension elements 36b and 36c. Alternatively, adjacent tension members may have a common anchor point as shown between tension elements 36a and 36b. Each of the tension elements has its own struts 38a, 38b and 38c. For simplicity, only a single strut is shown for each tension element although, in practice, multiple sets of struts may be used depending on the length of the tension members.

Thus, the embodiments of FIGS. 3-7 show how a tension element may be introduced on the trailing edge side of the load bearing member. The tension elements are anchored to the beam at their ends, but spaced apart from the beam by struts so that they act as suspension cables. The various arrangements shown increase the trailing edge stiffness reducing the likelihood of damage to the trailing edge through gravity driven fatigue caused by rotation of the rotor.

Figure 8:
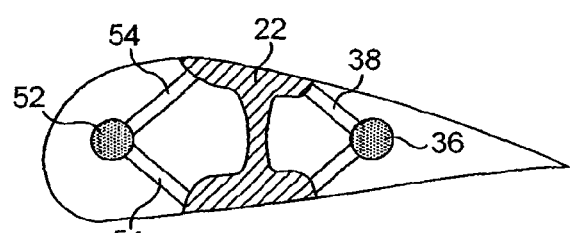
FIG. 8 is a cross-section through a blade showing enhanced stiffening on both the leading and trailing sides of the blade.
Figure 9:
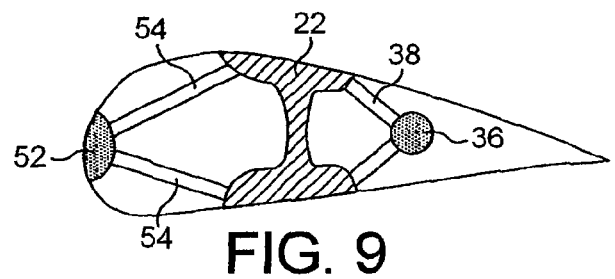
FIG. 9 is a variant of FIG. 8 showing how the leading edge stiffness enhancement of FIG. 8 may be incorporated into the blade skin.

FIGS. 8 and 9 show how the principle described with respect to FIGS. 3-7 may be extended to increase leading edge stiffness. In FIGS. 8 and 9 a similar arrangement to that of FIGS. 3-7 is used on the leading edge side of the blade. Although it is desirable to strengthen both the leading and trailing sides of the beam, it would be possible just to arrange the tension element on the leading edge side of the beam although this might require the trailing edge to be strengthened in some other way. An arrangement in which a tension element or plurality of tension elements is arranged only on the leading edge side of the beam is within the scope of the invention.

Thus, in FIG. 8, a corresponding tension element 52 is shown on the leading edge side of the beam 22. The leading edge tension element is anchored to the beam at its ends in the same manner as described above and is spaced apart from the beam along its length by struts 54 so that the leading edge tension element functions as a suspension cable. The leading edge tension element may be a single element extending the length of the beam along the lines shown in FIG. 3 or could adopt one of the alternatives discussed above, particularly with respect to FIGS. 6 and 7. The arrangement on the leading edge side of the beam need not be the same as that on the trailing edge side of the beam.

In the variant shown in FIG. 9, the tension element is integrated into the leading edge. This is possible on the leading edge side of the beam as the leading edge is closer to the beam than the trailing edge and is of a suitable shape. In this example, the leading edge tension element 52 may comprise strengthening fibres of the type used to form the upper and lower strengthening parts 24, 26 of the beam. This arrangement is particularly suited to a blade or leading edge which is pre-tensioned or pre-bent and allows tension in the leading edge to be controlled Many modifications to the examples discussed above are possible and will occur to those skilled in the art. As mentioned, the nature of the strengthening member is not important. The addition of the tension elements either on the trailing edge side and/or the leading edge side provide strengthening to the blade in the edgewise direction by increasing the second moment of inertia of the strengthening member. This is partly achieved by the use of a suspended tension element anchored at its end to the strengthening member and spaced away from the load bearing member over its length. The various embodiments of the invention enable the blade length to be increased whilst dealing with the problem of edgewise loading increasing the fourth power of length.

The invention claimed is:

1. A wind turbine blade comprising:
    a load bearing member;
    a blade shell, the blade having a leading edge and a trailing edge;
    a tension element spaced apart from the load bearing member, the tension element being anchored at its ends to the load bearing member; and
    at least one support strut attached to the load bearing member and extending away from the load bearing member, the support strut supporting the tension element at a position spaced away from the load bearing member.

2. The wind turbine blade according to claim 1, wherein the ends of the tension element are anchored to respective ends of the load bearing member.

3. The wind turbine blade according to claim 1, wherein a first end of the tension element is anchored to the root end of the load bearing member and a second end of the tension element is anchored to the load bearing member at a point away from a tip end of the load bearing member.

4. The wind turbine blade according to claim 1, wherein the tension element passes through an aperture in the support strut.

5. The wind turbine blade according to claim 1, wherein the struts each comprise a pair of legs, each leg having an end connected to the load bearing member, the struts receiving the tension element to space the tension element away from the load bearing member.

6. The wind turbine blade according to claim 1, wherein the struts each comprise three legs, each leg having an end connected to the load bearing member, the struts receiving the tension element to space the tension element away from the load bearing member.

7. The wind turbine blade according to claim 1, comprising a plurality of tension elements.

8. The wind turbine blade according to claim 7, wherein the plurality of tension elements include connecting elements to connect adjacent tension elements together to form a single tension element.

9. The wind turbine blade according to claim 8, wherein the connecting elements each comprise a tensioner for varying the tension in the tension elements.

10. The wind turbine blade according to claim 7, wherein each of the plurality of tension elements has ends anchored to the load bearing member and at least one support strut for spacing the tension element away from the load bearing member.

11. The wind turbine blade according to claim 1, wherein the tension element is arranged on the trailing edge side of the wind turbine blade.

12. The wind turbine blade according to claim 1, wherein the tension element is arranged on the leading edge side of the wind turbine blade.

13. The wind turbine blade according to claim 11, comprising a further tension element anchored at its ends to the load bearing member and spaced apart from the load bearing member on the leading edge side of the load bearing member by at least one strut.

14. The wind turbine blade according to claim 13, wherein the tension element on the leading edge side of the load bearing member is integral with the leading edge of the blade.

15. The wind turbine blade according to claim 1, wherein the load bearing member is a beam and the shell is attached to the beam.

16. The wind turbine blade according to claim 1, wherein the load bearing member comprises reinforced areas of the shell interconnected by a web.

17. A wind turbine comprising a rotor having a plurality of blades, wherein each of the blades comprises:
    a load bearing member;
    a blade shell, the blade having a leading edge and a trailing edge;
    a tension element spaced apart from the load bearing member, the tension element being anchored at its ends to the load bearing member; and at least one support strut attached to the load bearing member and extending away from the load bearing member, the support strut supporting the tension element at a position spaced away from the load bearing member.

* * * * *

UNITED STATES PATENT AND TRADEMARK OFFICE
CERTIFICATE OF CORRECTION

PATENT NO. : 8,870,546 B2  Page 1 of 1
APPLICATION NO. : 13/148144
DATED : October 28, 2014
INVENTOR(S) : Carsten Hein Westergaard It is certified that error appears in the above-identified patent and that said Letters Patent is hereby corrected as shown below:

On the Title Page

Add: --(73), Assignee: Vestas Wind Systems A/S, Randers SV, (DK)--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*